L. W. TURNER.
Pot-Lid.

No. 168,356.

Patented Oct. 5, 1875.

Witnesses.

Joseph M. Russell
M. Moulthrop

Inventor.

Lewis W. Turner
by his Attorney
George Terry

United States Patent Office.

LEWIS W. TURNER, OF WALLINGFORD, ASSIGNOR OF ONE-HALF HIS RIGHT TO G. J. CAPEWELL, OF CHESHIRE, CONNECTICUT.

IMPROVEMENT IN POT-LIDS.

Specification forming part of Letters Patent No. 168,356, dated October 5, 1875; application filed August 18, 1875.

*To all whom it may concern:*

Be it known that I, LEWIS W. TURNER, of the town of Wallingford, in the county of New Haven and State of Connecticut, have invented a new and useful Improvement in Pot-Lids; and I do hereby declare the following to be a full, clear, and exact description of the invention, such as will enable others skilled in the art to which it pertains to make and use it, reference being had to the accompanying drawing, which forms a part of this specification.

The nature of my invention consists in providing a pot-lid with means by which the pot may be tipped to empty it of its fluid contents, and by which the lid may be firmly held in its place during the operation, thus preventing the escape of anything movable and not fluid.

Figure 1:
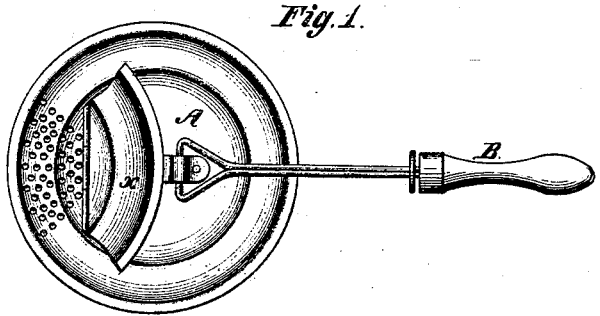

Figure 1 shows a perforated portion of the lid A, through which the fluid contents of the pot may flow out when the pot is tipped. This portion of the lid is furnished with a cover, $x$, which is hinged to the lid.

Figure 2:
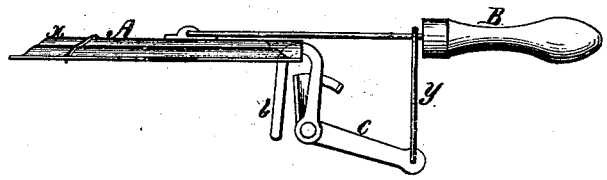

Fig. 2 shows the lid A and tipping contrivance, which consists of the lid A, perforated, as above described; of the handle B, which is hinged to the lid, and is long enough for the hand to grasp it outside of the lid; of the hook $b$, made of wire, which is doubled, has eyes formed on its ends, is bent in the form of the capital letter U, and passes through a slot in the edge of the lid; of the lever $c$, which is pivoted to the hook $b$, and which has its arms at right angles, and of the rod $y$, hinged to the longer arm of the lever $c$, and also to the handle B.

Made as above described, when the lid is placed on the pot, the hook $b$ passes down over the edge of the pot, and the operation of my device is as follows: As the handle B is raised, the longer arm of the lever $c$ is raised with it, causing the shorter arm of the lever, in connection with one arm of the hook $b$, to grasp and securely hold the pot, so that it may be tipped to any degree required As the strain comes on the rod $y$, the point of the handle B, in connection with the rod $y$, becomes the fulcrum, and the hinged end of the handle B presses down upon the lid and securely holds it on, and, the pot being sufficiently tipped, the fluid contents press upon and raise the cover $x$ and flow out, while the movable and non-fluid contents are withheld by the lid.

I claim as my invention—

The pot-lid A, provided with the handle B, hinged to the lid, also provided with the hook $b$, passing through a slot in the edge of the lid, lever $c$, pivoted to the hook $b$, and connected to the handle B by the rod $y$, all the said parts constructed and arranged to operate as and for the purpose described.

LEWIS W. TURNER.

Witnesses:
 GEORGE TERRY,
 JOHN McGUIRE.